(12) United States Patent
Ryan et al.

(10) Patent No.: US 12,377,488 B2
(45) Date of Patent: Aug. 5, 2025

(54) METHODS AND APPARATUS TO SWITCH A WELD POWER OUTPUT

(71) Applicant: Illinois Tool Works, Inc.

(72) Inventors: Joseph Robert Ryan, Greenville, WI (US); James Andrew Byrne, Appleton, WI (US); Richard Mark Achtner, Buchanan, WI (US); Anthony Van Bergen Salsich, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/500,703

(22) Filed: Nov. 2, 2023

(65) Prior Publication Data

US 2024/0066619 A1 Feb. 29, 2024

Related U.S. Application Data

(63) Continuation of application No. 16/563,989, filed on Sep. 9, 2019, now Pat. No. 11,819,960, which is a continuation of application No. 15/062,775, filed on Mar. 7, 2016, now Pat. No. 10,406,624.

(51) Int. Cl.
| | |
|---|---|
| B23K 9/10 | (2006.01) |
| B23K 9/095 | (2006.01) |
| B23K 9/235 | (2006.01) |
| B23K 9/32 | (2006.01) |
| H05B 6/04 | (2006.01) |
| H05B 6/10 | (2006.01) |

(52) U.S. Cl.
CPC .......... *B23K 9/1043* (2013.01); *B23K 9/0956* (2013.01); *B23K 9/1006* (2013.01); *B23K 9/1056* (2013.01); *B23K 9/235* (2013.01); *B23K 9/32* (2013.01); *H05B 6/04* (2013.01); *H05B 6/101* (2013.01)

(58) Field of Classification Search
CPC .......... H05B 6/101; H05B 6/04; B23K 9/235; B23K 9/1043; B23K 9/1006
See application file for complete search history.

(56) References Cited

U.S. PATENT DOCUMENTS

| | | | |
|---|---|---|---|
| 6,127,650 A | 10/2000 | Naruto | |
| 6,570,132 B1 | 5/2003 | Brunner | |
| 7,180,029 B2 | 2/2007 | Ott | |

(Continued)

FOREIGN PATENT DOCUMENTS

| | | |
|---|---|---|
| CN | 1187156 | 2/2005 |
| CN | 104379290 | 2/2015 |
| CN | 105008081 A | 10/2015 |

OTHER PUBLICATIONS

Exteded European Search Report for Appln No. 17150652.0-1702 dated Aug. 9, 2017.

*Primary Examiner* — Thien S Tran (74) *Attorney, Agent, or Firm* — McAndrews, Held & Malloy, Ltd.

(57) ABSTRACT

Methods and apparatus to communicate via a weld cable are disclosed. An example welding accessory includes a first port to receive input power via a first weld cable, a power converter to convert the input power to output power, a second port to output the input power via a second weld cable, and one or more output switches to selectively divert the input power from the power converter to the second port.

19 Claims, 4 Drawing Sheets

(56) References Cited

U.S. PATENT DOCUMENTS

| | | |
|---|---|---|
| 8,330,077 B2 | 12/2012 | Rappl |
| 8,592,724 B2 | 11/2013 | Ott |
| 8,779,329 B2 | 7/2014 | Rappl |
| 8,957,344 B2 | 2/2015 | Rappl |
| 9,012,807 B2 | 4/2015 | Ott |
| 9,162,311 B2 | 10/2015 | Ott |
| 2005/0230372 A1 | 10/2005 | Ott |
| 2005/0263513 A1 | 12/2005 | Leisner |
| 2007/0039935 A1* | 2/2007 | Justice .............. B23K 9/10 219/137.71 |
| 2012/0097644 A1 | 4/2012 | Ott |
| 2012/0251965 A1 | 10/2012 | Otto |
| 2013/0264319 A1 | 10/2013 | Temby |
| 2013/0277345 A1 | 10/2013 | Holverson et al. |
| 2013/0327747 A1 | 12/2013 | Dantinne |
| 2013/0327753 A1* | 12/2013 | Roth .............. B23K 9/124 219/137.71 |
| 2014/0076872 A1 | 3/2014 | Ott |
| 2014/0251965 A1* | 9/2014 | Wiryadinata ........ B23K 9/1006 219/130.1 |
| 2015/0136746 A1* | 5/2015 | Rappl .............. B23K 9/0953 219/130.21 |
| 2015/0158104 A1 | 6/2015 | Rappl |
| 2015/0196970 A1 | 7/2015 | Denis |
| 2015/0224591 A1 | 8/2015 | Ott |
| 2015/0273611 A1 | 10/2015 | Denis |
| 2015/0334782 A1 | 11/2015 | Garvey |
| 2016/0101482 A1 | 4/2016 | Ott |
| 2016/0136746 A1 | 5/2016 | Denis |

* cited by examiner

METHODS AND APPARATUS TO SWITCH A WELD POWER OUTPUT

BACKGROUND

The invention relates generally to welding systems, and more particularly to methods and apparatus to switch a weld power output.

Traditional single process welding systems support a variety of processes, such as metal inert gas (MIG) welding, tungsten inert gas (TIG) welding, stick welding, and so forth, which may operate in different modes, such as constant current or constant voltage. Such welding systems typically include a single output connection and, therefore, are configured to support a single process at a time. In contrast to these single process welding systems, multi-process welding systems may connect to and support multiple processes at the same time.

In some applications, weld process specifications and/or other considerations may require a workpiece to be pre-heated to a particular temperature range prior to performing a weld on the workpiece. Workpiece heating devices, such as induction heating devices, can be powered using the same power supply used to perform the welding.

SUMMARY

Methods and apparatus to communicate via a weld cable, substantially as illustrated by and described in connection with at least one of the figures, as set forth more completely in the claims.

DETAILED DESCRIPTION

In some welding applications, pre-heating and/or controlled cooling of a workpiece is required to avoid excess stress on the workpiece and/or to meet weld process specifications. Induction heaters, resistive heaters, and/or other types of heaters may be used to heat a workpiece. Inductive and/or resistive heating supplies may receive power from a power supply that is capable of providing welding current to a welding torch. However, to use a remote wire feeder for a welding application and an inductive and/or resistive heating system, conventional welding systems require attachment and detachment of cables between the inductive heating system, the remote wire feeder, and the power supply.

Weld cable communications (WCC) is a technology that permits communication between a power supply and a welding accessory via the same cable (e.g., the same conductor) used to carry welding current. Conventional systems limited WCC between only two devices.

Disclosed methods and apparatus provide for an intelligent heater system that enable rapid (e.g., immediate) transitions from heating to welding using the same power supply. In some disclosed examples, a welding accessory such as an inductive and/or resistive heater can be connected between a power supply and a second welding accessory such as a wire feeder. Additionally, disclosed examples enable weld cable communications to occur between more than two devices.

Disclosed examples enable a welding accessory to receive a minimal amount of power to perform control and/or monitoring functions while another accessory is receiving primary (e.g., welding) current. For example, an inductive and/or resistive heater may remain partially powered to perform recording while a wire feeder receives primary power from the power supply to accomplish a welding operation.

Additionally, disclosed examples provide for automatic monitoring and diversion of primary power to a particular welding accessory. For instance, if one accessory is likely to be used while another accessory is sitting idle, an automatic switch back to a previous accessory be implemented to increase the efficiency of a weld operator and/or reduce welding errors. In some examples, an inductive and/or resistive heater could be reenergized to provide heating output if a wire feeder and welding torch idle for longer than a specified length of time. To shift communications back to the wire feeder from the heater, the wire feeder may communicate the selection of a button on the wire feeder control panel and/or a trigger pull on a welding torch to cause the heater to return power to the wire feeder.

As used herein, the term "port" refers to one or more terminals(s), connector(s), plug(s), and/or any other physical interface(s) for traversal of one or more inputs and/or outputs. Example ports include weld cable connections at which a weld cable is physically attached to a device, an gas hose connector connectors that may make physical and/or electrical connections for input and/or output of electrical signals and/or power, physical force and/or work, fluid, and/or gas.

As used herein, the term "weld power consuming device" refers to any device that may receive power from a welding power supply as an input power source. For example, weld power consuming devices may receive up to a maximum output of the welding power supply for use by the weld power consuming device to perform one or more functions of the weld power consuming device, such as heating, welding, data monitoring, data communications, and/or any other operation(s) for which welding power can be used as a power source. Example weld power consuming devices include resistive and/or induction heaters, portable wire feeders, and/or weld torches.

Disclosed example welding accessories include a first port, a power converter, a second port, and one or more output switches. The first port receives input power via a first weld cable. The power converter converts the input power to output power. The second port outputs the input power via a second weld cable. The one or more output switches selectively divert the input power from the power converter to the second port.

Some example welding accessories further include a communications detector in communication with the second weld cable. The communications detector, in response to identifying a communication occurring on the second weld cable, causes the one or more output switches to divert the input power to the second port in response to the communication. Some example welding accessories further include a current watchdog to, in response to identifying that the second weld cable has not conducted welding current for at least a threshold time period, cause the one or more output switches to direct the input power to the power converter.

Some example welding accessories further include a third port to receive a temperature signal. Some example welding accessories further include a temperature monitor to convert the temperature signal to temperature information. Some example welding accessories further include a transceiver to transmit a communication including temperature information. Some example welding accessories further include a port to receive a temperature signal and a temperature monitor to convert the temperature signal to a temperature of a workpiece. The temperature monitor causes the one or more output switches to direct the input power to the power converter in response to a temperature condition or causes the one or more output switches to divert the input power to the second port in response to the temperature condition. Some example welding accessories further include a first weld cable transceiver to receive a temperature condition definition from a power supply via the first weld cable, where the temperature monitor identifies the temperature condition based on the received temperature condition definition.

Some example welding accessories further include a user interface to, in response to receiving an input via the user interface, cause the one or more output switches to direct the input power to the power converter. Some example welding accessories further include a secondary power converter to convert the input power to secondary power and to output the secondary power to the second port. In some such examples, the one or more output switches bypass the secondary power converter when the one or more output switches divert the input power to the second port.

Some example welding accessories further include a weld cable transceiver to send or receive communications via at least one of the first weld cable or the second weld cable. In some examples, the communications include destination information that identifies corresponding destinations of the communications. In some examples, the power converter converts the input power to heating power and outputs the heating power to a heating device when the one or more output switches direct the input power to the power converter.

Disclosed example methods include receiving, at a first port of a first weld power consuming device, input power via a first weld cable; converting the input power to output power with a power converter, the output power having at least one characteristic different than the input power; supplying the output power to an output device via a second port of the first weld power consuming device; and, in response to an indication that the input power is to be consumed by a second weld power consuming device, diverting the input power from the power converter to a third port of the first weld power consuming device using one or more switching devices.

Some example methods further include identifying the indication that the input power is to be consumed by the second weld power consuming device based on receiving a communication via the third port and the first weld cable while the input power is being received via the first port. In some such examples, the communication corresponds to an input at at least one of a welding torch or a user interface of the second weld power consuming device.

Some example methods further include detecting a communication received on a conductor in communication with the first port; decoding the communication to identify a destination of the communication; and, when the destination does not correspond to the first weld power consuming device, discarding the communication or, when the destination corresponds to the first weld power consuming device, executing an instruction based on a payload of the communication.

Some example methods further include identifying, via a current sensor, that a current from the first port to the third port is less than a threshold current for a time duration that satisfies a threshold time; and diverting the input power from the third port to the power converter using the one or more switching devices in response to the identifying. Some example methods further include identifying an input command via a user interface of the first weld power consuming device and diverting the input power from the third port to the power converter using the one or more switching devices in response to the input command.

Some example methods further include receiving a communication via the first port and the first weld cable while the input power is being received via the first port, and diverting the input power from the third port to the power converter using the one or more switching devices in response to the communication. Some example methods further include transmitting a communication via the first port and the first weld cable while the input power is being received via the first port.

Disclosed example welding systems include a power supply, an inductive heater, and a second weld power consuming device. The power supply includes a first power converter to convert primary power received at the power supply to secondary power. The inductive heater includes a first input port to receive the secondary power from the power supply, a first weld cable transceiver to communicate with the power supply via the first input port, a second power converter to convert the secondary power to inductive power, and one or more output switches. The one or more output switches select, based on at least one of a communication received at the first weld cable transceiver or detecting a switching condition, a heating port or a passthrough port. When the heating port is selected, the one or more output switches direct the secondary power to the second power converter. When the passthrough port is selected, the one or more output switches divert the secondary power from the first input port to the passthrough port. The second weld power consuming device includes a second input port to receive the secondary power from the inductive heater and a second weld cable transceiver to communicate with the power supply via the second input port.

Figure 1A:
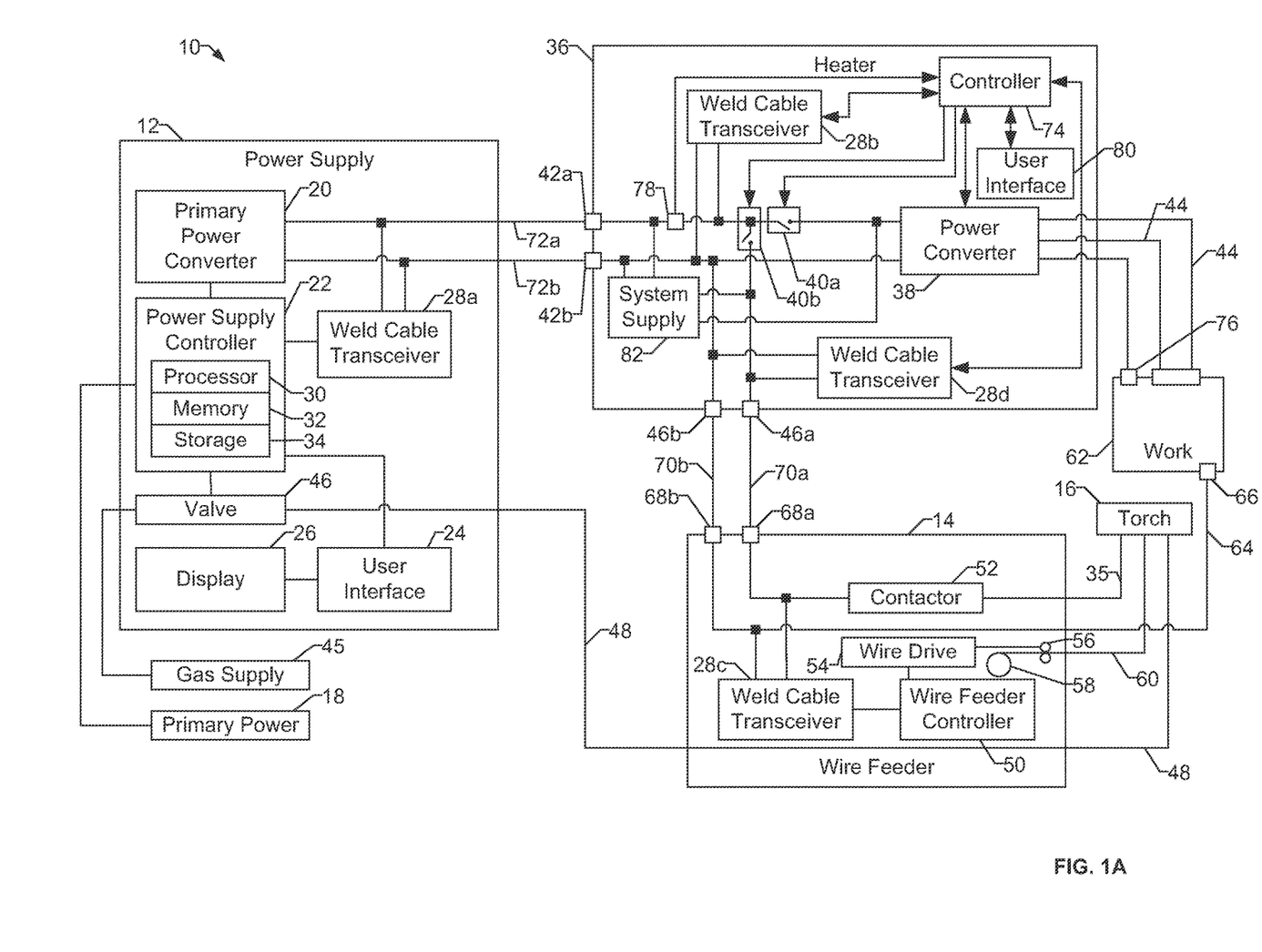
FIGS. 1A and 1B show example arc welding system constructed in accordance with aspects of this disclosure.

Turning now to the drawings, FIG. 1A is a block diagram of an example welding system 10 having a welding power supply 12, a wire feeder 14, and a welding torch 16. The welding system 10 powers, controls, and supplies consumables to a welding application. The welding torch 16 may be a torch configured for stick welding, tungsten inert gas (TIG) welding, or gas metal arc welding (GMAW), based on the desired welding application.

The welding power supply 12 receives primary power 18 (e.g., from the AC power grid, an engine/generator set, a battery, or other energy generating or storage devices, or a combination thereof), conditions the primary power, and provides an output power to one or more welding devices in accordance with demands of the system 10. The primary power 18 may be supplied from an offsite location (e.g., the primary power may originate from the power grid). The welding power supply 12 includes power conversion circuitry 20, which may include transformers, rectifiers, switches, and so forth, capable of converting the AC input power to AC and/or DC output power as dictated by the demands of the system 10 (e.g., particular welding processes and regimes).

In some examples, the power conversion circuitry 20 is configured to convert the primary power 18 to both weld and auxiliary power outputs. However, in other examples, the power conversion circuitry 20 is adapted to convert primary power only to a weld power output, and a separate auxiliary converter is provided to convert primary power to auxiliary power. In some other examples, the welding power supply 12 receives a converted auxiliary power output directly from a wall outlet. Any suitable power conversion system or mechanism may be employed by the welding power supply 12 to generate and supply both weld and auxiliary power.

The welding power supply 12 includes a power supply controller 22 to control the operation of the welding power supply 12. The welding power supply 12 also includes a user interface 24. The power supply controller 22 receives input from the user interface 24, through which a user may choose a process and/or input desired parameters (e.g., voltages, currents, particular pulsed or non-pulsed welding regimes, and so forth). The user interface 24 may receive inputs using any input device, such as via a keypad, keyboard, buttons, touch screen, voice activation system, wireless device, etc. Furthermore, the power supply controller 22 controls operating parameters based on input by the user as well as based on other current operating parameters. Specifically, the user interface 24 may include a display 26 for presenting, showing, or indicating, information to an operator. The power supply controller 22 may also include interface circuitry for communicating data to other devices in the system 10, such as the wire feeder 14. For example, in some situations, the welding power supply 12 wirelessly communicates with other welding devices within the welding system 10. Further, in some situations, the welding power supply 12 communicates with other welding devices using a wired connection, such as by using a network interface card (NIC) to communicate data via a network (e.g., ETHERNET, 10baseT, 10base100, etc.) and/or a control cable to communicate via a direct wired connection. In the example of FIG. 1A, the power supply controller 22 may communicates with a weld cable transceiver 28, as described below.

The power supply controller 22 includes at least one controller or processor 30 that controls the operations of the welding power supply 12. The power supply controller 22 receives and processes multiple inputs associated with the performance and demands of the system 10. The processor 30 may include one or more microprocessors, such as one or more "general-purpose" microprocessors, one or more special-purpose microprocessors and/or ASICS, and/or any other type of processing device. For example, the processor 30 may include one or more digital signal processors (DSPs).

The example power supply controller 22 includes a storage device 32 and a memory device 34. The storage device 32 (e.g., nonvolatile storage) may include ROM, flash memory, a hard drive, and/or any other suitable optical, magnetic, and/or solid-state storage medium, and/or a combination thereof. The storage device 32 stores data (e.g., data corresponding to a welding application), instructions (e.g., software or firmware to perform welding processes), and/or any other appropriate data. Examples of stored data for a welding application include an attitude (e.g., orientation) of a welding torch, a distance between the contact tip and a workpiece, a voltage, a current, welding device settings, and so forth.

The memory device 34 may include a volatile memory, such as random access memory (RAM), and/or a nonvolatile memory, such as read-only memory (ROM). The memory device 34 may store a variety of information and may be used for various purposes. For example, the memory device 34 may store processor executable instructions (e.g., firmware or software) for the processor 30 to execute. In addition, one or more control regimes for various welding processes, along with associated settings and parameters, may be stored in the storage device 32 and/or memory device 34, along with code configured to provide a specific output (e.g., initiate wire feed, enable gas flow, capture welding current data, detect short circuit parameters, determine amount of spatter) during operation.

The example welding system 10 also includes an induction heater 36. In the illustrated example, the welding power source 12 is configured to supply power to the induction heater 36, which may consume the supplied power (e.g., to perform heating) and/or may direct the supply power to the wire feeder 14. The wire feeder 14 routes the input power to the welding torch 16. In addition to supplying power to the torch 16, the wire feeder 14 may supply a filler metal to a welding torch 16 via a weld cable 35 for various welding applications (e.g., GMAW welding, flux core arc welding (FCAW)).

The example induction heater 36 of FIG. 1A includes a power converter 38 and switching devices 40*a*, 40*b*. The induction heater 36 is coupled to the power supply 12 to receive the input power via input ports 42*a*, 42*b*. The input ports 42*a*, 42*b* correspond to positive and negative voltage references. For example, the input port 42*a* may be connected to a weld cable connection (e.g., a positive voltage terminal) of the power supply 12 and the input port 42*b* may be connected to a work cable connection (e.g., a negative or reference voltage terminal) of the power supply 12.

The power converter 38 converts input power received from the power supply 12 via the input ports 42*a*, 42*b* into output power. For example, the power converter 38 may output the output power to drive induction heating cables 44 that are used to heat a workpiece prior to performing a weld.

The switching devices 40*a*, 40*b* selectively direct input power received from the power supply 12 to the power converter 38 and/or to passthrough ports 46*a*, 46*b* that connect the induction heater 36 to the wire feeder 14. As described in more detail below, the switching devices 40*a*, 40*b* may be controlled to direct the input power to the power converter 38 and/or to divert the power to the passthrough ports 46*a*, 46*b* in response to any number of conditions or stimuli, such as weld cable communications from the power supply 12 and/or from the wire feeder 14, sensor input at the heater 36, receiving commands at a user interface, and/or timeout condition(s). While the example of FIG. 1A shows two single pole, single throw switches 40*a*, 40*b*, in other examples (e.g., FIG. 1B) a single pole, double throw switch 40 may be used. Any other type of switch may be used to implement the switching device(s) 40.

In some examples, a gas supply 45 provides shielding gases, such as argon, helium, carbon dioxide, and so forth, depending upon the welding application. The shielding gas flows to a valve 46, which controls the flow of gas, and if desired, may be selected to allow for modulating or regulating the amount of gas supplied to a welding application. The valve 46 may be opened, closed, or otherwise operated by the power supply controller 22 to enable, inhibit, or control gas flow (e.g., shielding gas) through the valve 46. Shielding gas exits the valve 46 and flows through a gas line 48 (which in some implementations may be packaged with the welding power output) to the wire feeder 14 which provides the shielding gas to the welding application. In some examples, the welding system 10 does not include the gas supply 45, the valve 46, and/or the gas line 48.

In some examples, the weld cable transceiver 28*a* disposed in the welding power supply 12 communicates with the weld cable transceiver 28*b* disposed in the heater 36 and/or with the weld cable transceiver 28*c* disposed in the wire feeder 14. For example, the weld cable transceivers 28*a*, 28*b*, 28*c* may exchange instructions (e.g., requested welding parameters) and/or welding data (e.g., information describing the weld measured at and/or near the torch 16). As an example, the processor(s) 30 may receive signals from the weld cable transceiver 28*c* to derive the actual current being delivered during operations (e.g., through the weld cable 35 and/or at the welding torch 16), as opposed to the current being measured at the welding power supply 12. Any and all techniques used by the weld cable transceivers 28*a*, 28*b*, 28*c* to transmit and/or receive data. For example, the weld cable transceivers 28*a*, 28*b*, 28*c* may utilize IEEE standard P1901.2 to provide data communications over the weld cables 70*a*, 72*a* that also provide welding power (e.g., to superimpose data signals and the weld power). Example methods and systems to provide welding power and data communications via the same cable (e.g., the same conductor) are described in U.S. Patent Application Publication No. 2015/0196970, filed Jan. 10, 2014, entitled "Devices and Methods for Communicating in a Welding System." The entirety of U.S. Patent Application Publication No. 2015/0196970 is incorporated herein by reference. Other communication techniques may also be used.

In some examples, the ability of the weld cable transceiver 28*a* in the power supply 12 to communicate with the weld cable transceiver 28*b* in the heater 36 and/or with the weld cable transceiver 28*c* is dependent on the configuration of the switching devices 40*a*, 40*b*.

In some examples, the wire feeder 14 uses the welding power to power the various components in the wire feeder 14, such as to power a wire feeder controller 50 (e.g., control circuitry). As noted above, the weld cables 70*a*, 72*a* may be configured to provide or supply the welding power. The welding power supply 12 may also communicate with the wire feeder 14 using the weld cables 70*a*, 72*a* and the weld cable transceiver 28*a* disposed within the welding power supply 12. In some examples, the wire feeder 14 includes the weld cable transceiver 28*c*, which is substantially similar to the weld cable transceiver 28*a* of the welding power supply 12. Indeed, the weld cable transceiver 28*c* of the wire feeder 14 may cooperate with the wire feeder controller 50 of the wire feeder 14 in similar ways as the welding power supply 12 cooperates with the power supply controller 22. The wire feeder controller 50 controls the operations of the wire feeder 14. In some examples, the wire feeder 14 uses the wire feeder controller 50 to detect whether the wire feeder 14 is in communication with the welding power supply 12 and to detect a current welding process of the welding power supply 12 if the wire feeder 14 is in communication with the welding power supply 12.

A contactor 52 (e.g., high amperage relay) is controlled by the wire feeder controller 50 and configured to enable or inhibit welding power to continue to flow to the weld cable 35 for the welding application. In some examples, the contactor 52 is an electromechanical device. However, the contactor 52 may be any other suitable device, such as a solid state device. While one contactor 52 is illustrated in FIG. 1A, multiple contactors may be used. The wire feeder 14 includes a wire drive 54 that receives control signals from the wire feeder controller 50 to drive rollers 56 that rotate to pull wire off a spool 58 of wire. The wire is provided to the welding application through a wire cable 60. Likewise, the wire feeder 14 may provide the shielding gas through the gas line 48. The cables 35, 48, and 60 may be bundled together and/or individually provided to the welding torch 16.

The welding torch 16 delivers the wire, welding power, and shielding gas for a welding application. The welding torch 16 is used to establish a welding arc between the welding torch 16 and a workpiece 62. A work cable port 63 couples a work cable 64 to the power supply 12 (e.g., to the power conversion circuitry 20). The example work cable port 63 enables attachment and/or detachment of the work cable 64 to the wire feeder 14 for ease of replacement of the work cable 64. The work cable 64 may be terminated with a clamp 65 (or another power connecting device), couples the welding power supply 12 and/or the wire feeder 14 to the workpiece 62 to complete a welding power circuit.

As mentioned above, the wire feeder 14 is selectively connected to the power supply 12 via the switching devices 40*a*, 40*b* of the heater 36. The example wire feeder 14 of FIG. 1A includes input ports 68*a*, 68*b* that are connected to the passthrough ports 46*a*, 46*b* of the heater 36 by respective cables 70*a*, 70*b*. The input ports 42*a*, 42*b* are connected to the power supply 12 by respective cables 72*a*, 72*b*. As used herein, the example cables 70*a*, 70*b* may be referred to as weld cables because the cables 70*a*, 72*a* carry the weld current provided to the weld cable 35 connected to the torch 16. Similarly, the example cables 70*b*, 72*b* may be referred to as work cables, because the cables 70*b*, 72*b* carry the return current from the work cable 64 that is connected to the workpiece 62.

In some examples, the welding power flows from the power conversion circuitry 20 through the weld cables 35, 70*a*, 72*a* to the wire feeder 14 and the welding torch 16. The example ports 42*a*, 42*b*, 46*a*, 46*b*, 68*a*, 68*b* enable attachment and/or detachment of the cables 35, 70*a*, 70*b*, 72*a*, 72*b* and the power supply 12, the heater 36, and/or the wire feeder 14 (e.g., to enable ease of replacement of the cables 35, 70*a*, 70*b*, 72*a*, 72*b* in case of wear or damage). Furthermore, in some examples, welding data is provided with the cables 35, 70*a*, 70*b*, 72*a*, 72*b* such that welding power and weld data are provided and transmitted together over the cables 35, 70*a*, 70*b*, 72*a*, 72*b*. The weld cable transceivers 28*a*-28*c* are communicatively coupled to the cables 35, 70*a*, 70*b*, 72*a*, 72*b* to communicate (e.g., send/receive) data over the cables 35, 70*a*, 70*b*, 72*a*, 72*b*. The weld cable transceivers 28*a*, 28*b*, 28*c* may be implemented based on various types of power line communications methods and techniques. For example, the weld cable transceivers 28*a*, 28*b*, 28*c* may utilize IEEE standard P1901.2 to provide data communications over the cables 70*a*, 70*b*, 72*a*, 72*b*. In this manner, the cables 70*a*, 70*b*, 72*a*, 72*b* may be utilized to provide welding power from the welding power supply 12 to the wire feeder 14 and the welding torch 16. Additionally or alternatively, the weld cables 70*a*, 70*b*, 72*a*, 72*b* may be used to transmit and/or receive data communications to/from the wire feeder 14 and the welding torch 16. The weld cable transceivers 28*a*, 28*b*, 28*c* are communicatively coupled to the weld cables 70*a*, 70*b*, 72*a*, 72*b*, for example, via a cable data coupler 37, to characterize the weld cables 70*a*, 70*b*, 72*a*, 72*b*, as described in more detail below.

The heater 36 is an example of a welding accessory that may be used to implement multi-device communications via weld cable communications. However, the methods and apparatus disclosed herein are applicable to other weld accessories in addition to heating devices. Whereas conventional weld cable communication used point-to-point communication, the example heater 36 enables multi-device communications between power supplies and/or welding accessories without independent weld cable ports, one-to-many cable adapters, or external communications switches. Instead, the example heater 36 determines whether power and/or weld cable communications from the power supply 12 are to be applied by the heater 36 or diverted to the wire feeder 14. For example, the heater 36 may use contextual information to determine the stage of the welding operation that is occurring.

The example heater includes a controller 74 to control the switching devices 40a, 40b. The controller 74 communicates with the power supply 12 via the weld cable transceiver 28b.

In some examples, the heater 36 includes a second weld cable transceiver 28d separate from the weld cable transceiver 28b. By including separate weld cable transceivers 28b, 28d, the example heater 36 may simultaneously conduct weld cable communications with both the power supply 12 (e.g., to send temperature data and/or receive commands) and with the wire feeder 14 (e.g., to receive data indicating that switching devices 40a, 40b are to be switched between directing power to the power converter 38 and/or diverting power to the passthrough ports 46a, 46b).

The example heater 36 (e.g., via the controller 74) initializes by configuring the switching devices 40a, 40b to direct input power from the power supply 12 to the power converter 38. The power converter 38 converts the input power to inductive heating power (or some other power appropriate to the accessory), which is output to the workpiece 62 via the heating cables 44 to inductively heat the workpiece 62 to a desired temperature. The power converter 38 and/or the controller 74 receive temperature measurements from one or more thermocouples 76. In some examples, when the signals received from the thermocouple(s) 76 indicate that the workpiece 62 has been heated to a specified temperature range, the controller 74 controls the switching devices 40a, 40b to divert the input power to the passthrough ports 46a, 46b.

Alternatively, if (while the input power is still being directed to the power converter 38) a weld operator (e.g., a user of the torch 16) enters an input to the wire feeder 14, such as changing a setting at the wire feeder 14 and/or pulling a trigger of the torch 16, the example weld cable transceiver 28c of the wire feeder 14 transmits a message via the cable(s) 70a, 70b, which is received at the weld cable transceiver 28d. In response, the weld cable transceiver 28d provides an indication to the controller 74 that the wire feeder 14 is to be powered. Based on the indication from the weld cable transceiver 28d, the controller 74 controls the switching devices 40a, 40b to divert the input power to the passthrough ports 46a, 46b.

When the switching devices 40a, 40b are configured to divert the input power to the passthrough port 46a, 46b, the example controller 74 monitors the current flowing from the input port 42a to the passthrough port 46a via a current sensor 78. If the current sensed by the current sensor 78 is less than a threshold current (e.g., indicating that welding is not occurring) for at least a threshold time (e.g., as monitored by a watchdog timer), the controller 74 controls the switching devices 40a, 40b to divert or re-direct the input power to the power converter 38. The example controller 74 controls the power converter 38 to convert the input power to heating power to, for example, maintain a required temperature of the workpiece to reduce a re-heating time when the operator returns to the workpiece and/or to enter a cool-down phase to cool down the workpiece 62 in a controlled manner.

Additionally or alternatively, the controller 74 monitors a user interface 80 of the heater 36 for input. The example user interface 80 may include temperature controls and/or a selection button to enable and/or disable the power converter 38 (e.g., to enable manual triggering of the controller 74 to configure the switching devices 40a, 40b). If the switching devices 40a, 40b are configured to divert the input power to the passthrough port 46a, 46b, and the user interface 80 receives input, the controller 74 configures the switching devices 40a, 40b to direct the input power to the power converter 38.

While the switching devices 40a, 40b are configured to divert the input power to the passthrough port 46a, 46b, the controller 74 also monitors the temperature signal(s) from the thermocouple(s) 76. If the controller 74 identifies a temperature at the workpiece 62 below a threshold temperature (e.g., outside of a weld process specification), the controller 74 configures the switching devices 40a, 40b to direct the input power to the power converter 38 to re-heat the workpiece 62.

The heater 36 of FIG. 1A further includes a system supply 82 to provide lower levels of power to the wire feeder 14 via the passthrough port 46a when the switching devices 40a, 40b are not configured to divert the input power to the passthrough port 46a. For example, the system supply 82 may provide sufficient power from the input power to enable the wire feeder controller 50 to operate. Additionally or alternatively, the power provided by the system supply 82 is not sufficient to perform welding operations or heating operations.

Additionally or alternatively, the system supply 82 may provide lower levels of power to the controller 74 when the output switching devices 40a, 40b are configured to divert the input power to the passthrough ports 46a, 46b. For example, the system supply 82 may provide sufficient power to the controller 74 to enable the controller 74 to monitor and/or log temperature measurements and/or to control the switching devices 40a, 40b to re-direct power to the power converter 38 as mentioned above.

In some examples, the system supply 82 provides power sharing between the heater 36 and the wire feeder 14 to enable heating and welding to occur simultaneously. For example, the controller 74 may determine an amount of the power provided by the power supply 12 that is required by the wire feeder 14 (e.g., to accomplish an acceptable weld) based on a communication from the wire feeder 14 and/or based on monitoring the voltage and/or current being drawn by the wire feeder 14. The example controller 74 controls the system supply 82 to provide any available power (or a specified amount of power) to the power converter 38 to heat the workpiece 62. While in this example the wire feeder 14 and/or welding operation takes priority over heating, in other examples the controller 74 controls the system supply 82 to give priority to the power converter 38 to accomplish a heating operation, and controls the system supply 82 to permit welding operations to be performed up to a specified power output. In some examples, if the power converter 38 takes priority and the wire feeder 14 requests more power than is available, the controller 74 communicates an error or other message to the wire feeder 14, which may be displayed to a user to indicate that the requested weld operation is not permitted due to heating power taking priority.

In some examples, the system supply 82 detects attempts by the wire feeder 14 to draw power (e.g., in response to a weld torch trigger pull) such as by measuring a change in output impedance and/or a voltage change via the passthrough port 46a, 46b. The example system supply 82 provides an indication of the attempted current draw to the controller 74, which may respond to the indication by determining which of the power converter 38 and/or the passthrough port 46a, 46b are to receive the input power.

In some examples, the weld cable transceivers 28a-28c of FIG. 1A are connected on a same bus during at least some of the time (e.g., when the switching devices 40a, 40b are diverting power from the input ports 42a-42b to the passthrough ports 46a, 46b), where messages transmitted by one of the weld cable transceivers 28a-28c are received at all of the other weld cable transceivers 28a-28c. In some such examples, the weld cable transceivers 28a-28c include address or destination information in transmitted communications, where each of the power supply 12, the heater 36, and the wire feeder 14 are assigned different addresses and/or different identifiers for use in addressing communications.

Additionally or alternatively, the weld cable transceivers 28a-28c may be provided with separate command codes or instructions for communicating with different ones of the power supply 12, the heater 36, and the wire feeder 14. For example, the power supply 12 may use different codes and/or message formats to communicate with the heater 36 than the codes and/or message formats used to communicate with the wire feeder 14.

Figure 1B:
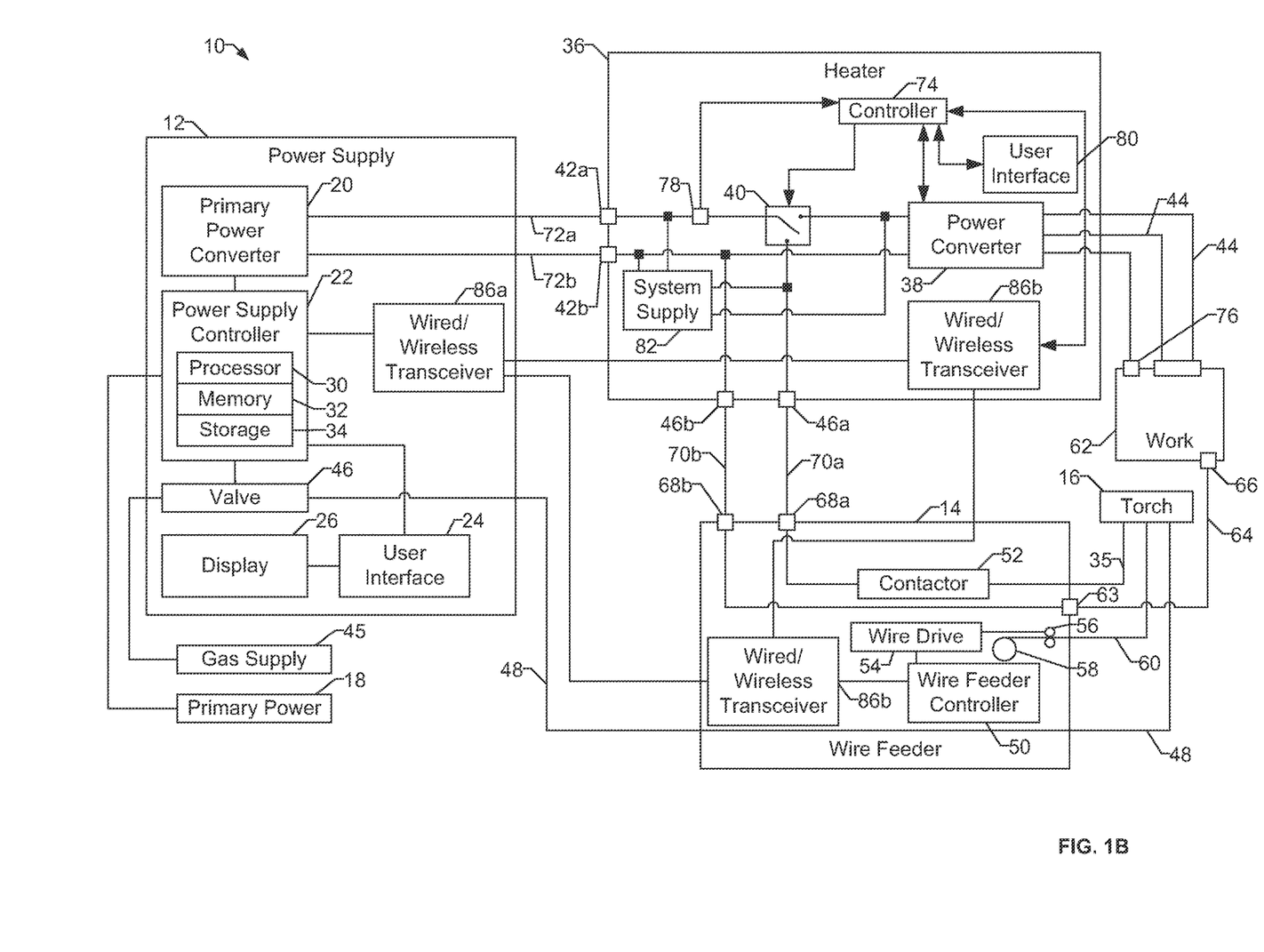

FIG. 1B shows another example welding system 84. In contrast to the example welding system 10 of FIG. 1A, the welding system 84 of FIG. 1B uses wired or wireless communications transceivers to communicate via a different medium than the weld cables 70a-70b, 72a-72b. The example power supply 12, the example heater 36, and the example wire feeder 14 each include a wired/wireless transceiver 86a, 86b, 86c. The example wired/wireless transceivers 86a, 86b, 86c provide communications between the example power supply 12, the example heater 36, and/or the example wire feeder 14 to provide the information described above with reference to the weld cable transceivers 28a-28d.

While the example of FIG. 1A shows three welding devices configured to communicate via weld cable communications, the power supply 12 and/or the wire feeder 14 may be configured with switching devices in a similar manner as the heater 36 to enable any number of welding devices to be configured for communication.

Figure 2A:
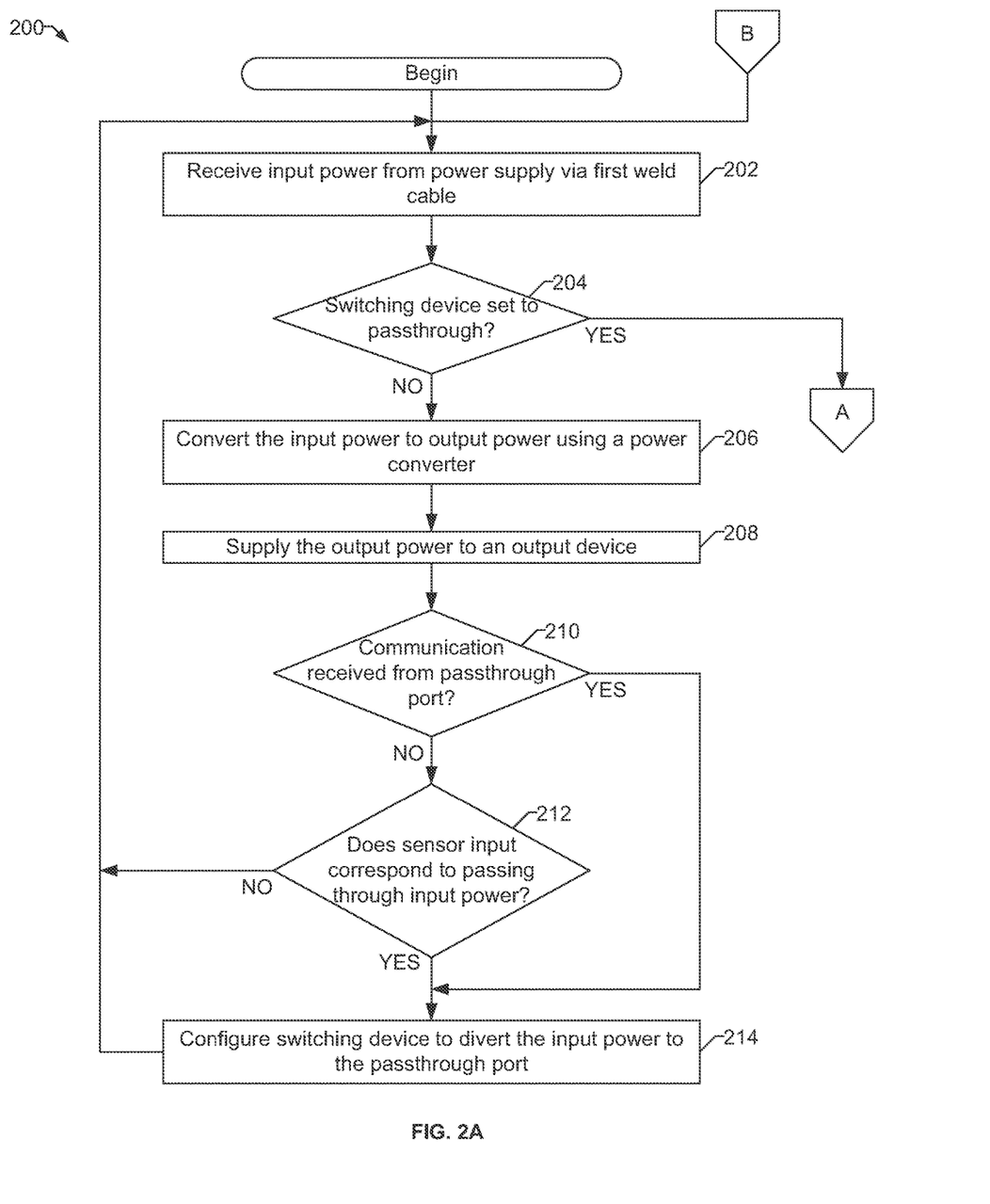
FIGS. 2A-2B show a flowchart illustrating an example method which may be implemented by a welding accessory such as the example heater of FIG. 1A.
Figure 2B:
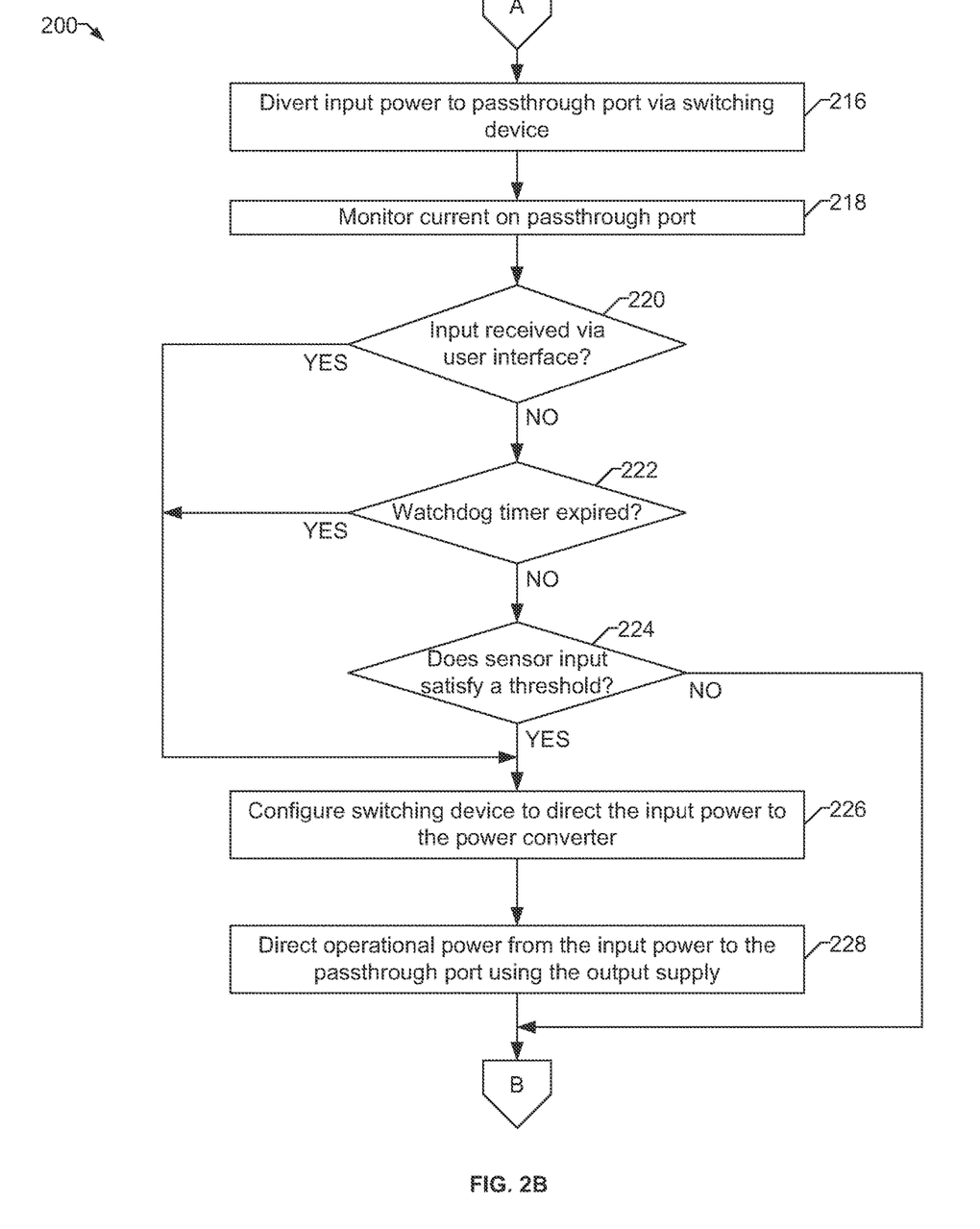

FIGS. 2A and 2B illustrate example machine readable instructions 200 which may be executed by the controller 74 of FIG. 1A to provide weld cable communications between three or more welding devices. The instructions 200 are described below with reference to the welding system 10 of FIG. 1A. In the illustrated example, at an initialization of the controller 74, the switching devices 40a, 40b are set to direct power to the power converter 38.

Referring to FIG. 2A, at block 202, the example heater 36 receives input power from the power supply 12 via a first weld cable 72a connected to an input port 42a.

At block 204, the controller 74 of the heater 36 determines whether the switching devices 40a, 40b are set to a pass through mode. For example, the controller 74 may determine whether the switching devices 40a, 40b are being controlled to pass through (e.g., divert) the input power from the input port 42a to the passthrough port 46a. If the switching devices 40a, 40b are not set to a passthrough mode, the switching devices 40a, 40b are set to direct the input power to the power converter 38 in the example of FIG. 1A.

When the switching devices 40a, 40b are not set to passthrough (block 204), at block 206 the power converter 38 converts the input power from the input port 42a to output power. Example output power includes inductive heating energy applied to the inductive heating cables 44 of FIG. 1A. At block 208, the power converter 38 supplies the output power to an output device (e.g., the heating cables 44).

At block 210, the controller 74 determines whether a communication has been received from the passthrough port 46a. For example, the controller 74 may receive a signal from the weld cable transceiver 28d in response to a weld cable communication from the weld cable transceiver 28c of the wire feeder 14. In some examples, the signal indicates that a welding parameter has been adjusted via the wire feeder 14 and/or that a welding operator has pulled the trigger of the torch 16. In some examples, the communication is an attempt by the wire feeder 14 (or other attached device) to draw power, such as weld power.

If a communication has not been received from the passthrough port 46a (block 210), the controller 74 determines whether a sensor input corresponds to passing through the input power to the passthrough port (block 212). For example, the controller 74 may determine that a temperature signal received from the thermocouple(s) 76 of FIG. 1A corresponds to a desired temperature range for the workpiece 62. In some examples, the controller 74 may prevent configuration of the switching devices 40a, 40b to direct the input power to the passthrough port 46a (e.g., blocking manual switching via a user interface) when the sensor input indicates that the passthrough could result in a defect or other problem. For example, if the temperature of the workpiece 62 (determined via the thermocouple(s) 76) is less than a minimum temperature, the controller 74 does not permit the input power to be provided to the wire feeder 14 or the torch 16 via the passthrough port 46a to potentially prevent a defective weld. If the controller 74 does not identify a sensor input that corresponds to passing through the input power to the passthrough port 46a (block 212), control returns to block 202 to continue receiving input power via the input port 42a.

If a communication has been received from the passthrough port 46a (block 210) and/or if the controller 74 identifies a sensor input that corresponds to passing through the input power to the passthrough port 46a (block 212), at block 214 the controller 74 configures the switching devices 40a, 40b to divert the input power to the passthrough port 46a. For example, the controller 74 may provide a switching signal to the switching devices 40a, 40b to break an electrical connection between the input port 42a and the power converter 38 and to establish an electrical connection between the input port 42a and the passthrough port 46a.

Referring to FIG. 2B, if, at block 204, the controller 74 determines that the switching devices 40a, 40b are set to a pass through mode, the switching devices 40a, 40b divert the power received at the input port 42a to the passthrough port 46a (block 216). At block 218, the current sensor 78 monitors the current passing through the passthrough port 46a. In some examples, the current sensor 78 causes the controller 74 to reset or halt a current watchdog timer while the measured current is at least a threshold current (e.g., a minimum welding current).

At block 220, the example controller 74 determines whether an input has been received via the user interface 80 (block 220). For example, an input button or other device may be selected at the user interface 80 by a weld operator, a helper, or another person.

If an input has been received via the user interface 80, the controller 74 determines whether the watchdog timer has expired (block 222). For example, the watchdog timer may expire if the monitored current is less than the current threshold for a least a threshold time period. The threshold time duration may be selected based on a likelihood such that, if welding has not occurred for at least the threshold time duration, the workpiece 62 should be reheated to reduce (e.g., eliminate) a re-heating time when the operator wishes to resume welding. Additionally or alternatively, expiration of the watchdog timer may cause the controller 74 to invoke a cool down procedure to permit cooling of the workpiece 62 within a weld process specification.

If the watchdog timer has not expired (block 222), the controller 74 determines whether a sensor input satisfies a measurement threshold (block 224). For example, the controller 74 may compare a temperature signal received from the thermocouple(s) 76 to a temperature threshold (e.g., a lower threshold). For example, if the controller 74 determines that the temperature of the workpiece 62 goes below a specified threshold temperature (e.g., less than a minimum acceptable temperature at which welding can be performed), the controller 74 may initiate re-heating of the workpiece 62 by the power converter 38 and the heating cables 44.

If an input has been received via the user interface 80 (block 220), the watchdog timer has expired (block 222), and/or the sensor input satisfies the threshold (block 224), the controller 74 configures the switching devices 40a, 40b to direct the input power to the power converter 38 (block 226). For example, the controller 74 may signal the switching device 40 to break an electrical connection with the passthrough port 46a and to establish an electrical connection with the power converter 38. At block 228, the system supply 82 directs operational power from the input power to the passthrough port 46a. The operational power is power that is sufficient to power the control systems connected to the passthrough port 46a (e.g., the wire feeder controller 50). In some examples, the change in voltage at the passthrough port 46a automatically causes the system supply 82 to begin providing the operational power.

After the system supply 82 begins providing the operational power (block 228), or if no input has been received via the user interface 80 (block 220), the watchdog timer has not expired (block 222), and the sensor input does not satisfy the threshold (block 224), control returns to block 202 of FIG. 2A to continue receiving (and appropriately directing) the input power from the power supply 12.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

The present methods and/or systems may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding system, comprising:
   a welding power supply configured to output welding power; and
   a first welding accessory configured to receive the welding power from the welding power supply and comprising:
   a power converter configured to consume the welding power;
   one or more pass-through ports configured to connect the first welding accessory to a second welding accessory;
   first and second switching devices configured to direct the welding power to the power converter or to the second welding accessory; and
   a controller configured to:
   monitor the welding power from the welding power supply; and
   control the first and second switching devices to direct the welding power to the power converter or the one or more pass-through ports based on at least a change of impedance or voltage at the pass-through ports.

2. The welding system of claim 1, wherein the welding power supply is configured to output the welding power via first and second cables.

3. The welding system of claim 1, wherein the second welding accessory is configured to provide the welding power to the first welding accessory via the one or more pass-through ports.

4. The welding system of claim 1, further comprising a temperature sensor configured to:
   measure a temperature information of a workpiece; and
   transmit the temperature information to the first welding accessory, wherein the first and second switching devices direct the welding power to the power converter if the temperature information meets a temperature threshold.

5. The welding system of claim 4, wherein the controller is configured to communicate with the temperature sensor by one or both of wired communication or wireless communication.

6. The welding system of claim 1, wherein the second welding accessory comprises a current monitoring device for measuring a current of the welding power and a voltage monitoring device for measuring the voltage of the welding power.

7. The welding system of claim 6, wherein one or both of the measured current or measured voltage is stored in one or both of a memory device or a storage device.

8. The welding system of claim 1, wherein the change of impedance or the voltage at the pass-through ports is an attempt by the second welding accessory to draw power.

9. The welding system of claim 1, wherein the controller is configured to control the directing of the welding power in response to the change of impedance or the voltage and based on whether the power converter or the second welding accessory has a higher priority to receive the welding power.

10. The welding system of claim 9, wherein the controller communicates an error message to the second welding accessory when the power converter has the higher priority to receive the welding power.

11. The welding system of claim 1, further comprising a user interface configured to be used to enter information regarding welding of a workpiece.

12. The welding system of claim 1, wherein the first welding accessory is a wire feeder.

13. A welding system, comprising:
    a welding power supply configured to output welding power;
    a first welding accessory connected to the welding power supply via input ports and connected to a second welding accessory via one or more pass-through ports and comprising:
    a power converter configured to consume the welding power;
    a controller configured to monitor the welding power from the welding power supply; and
    one or more switching devices configured to:
    direct the welding power to the power converter; and
    divert the welding power to the one or more pass-through ports when a signal is received.

14. The welding system of claim 13, wherein the signal is an attempt to draw power by the first welding accessory or a temperature signal from a sensor.

15. The welding system of claim 13, further comprising a temperature sensor configured to:
    measure a temperature information of a workpiece; and
    transmit the temperature information to the second welding accessory, wherein the one or more switching devices direct the welding power to the power converter if the temperature information meets a temperature threshold.

16. The welding system of claim 13, wherein the controller is configured to monitor the welding power by measuring a current of the welding power or a voltage of the welding power.

17. The welding system of claim 1, wherein the welding power supply is configured to output the welding power via first and second cables.

18. A welding system, comprising:
    a welding power supply configured to output welding power via first and second cables;
    a heater comprising a power converter and configured to:
    receive the welding power from the welding power supply;
    monitor the welding power from the welding power supply;
    consume the welding power; and
    divert the welding power to one or more pass-through ports when a signal is received from the one or more pass-through ports, wherein the one or more pass-through ports are connected to a wire feeder.

19. The welding system of claim 18, wherein the signal is an attempt to draw power by the wire feeder or a temperature signal from a sensor.

* * * * *